United States Patent [19]

Hermant et al.

[11] Patent Number: 5,224,978
[45] Date of Patent: Jul. 6, 1993

[54] METHOD FOR MAKING HOT ROLLED DIFFUSING GLAZINGS

[75] Inventors: Philippe Hermant, Puteaux; Gérard Chambard, Compiègne; Guillaume Saalburg, Paris, all of France

[73] Assignee: Saint-Gobain Vitrage International, Courbevoie, France

[21] Appl. No.: 812,099

[22] Filed: Dec. 23, 1991

[30] Foreign Application Priority Data

Dec. 21, 1990 [FR] France ............................ 90 16093

[51] Int. Cl.⁵ .............................................. C03B 13/08
[52] U.S. Cl. .......................................... 65/94; 65/93; 65/255
[58] Field of Search ................ 65/93, 94, 255, 101, 65/102

[56] References Cited

U.S. PATENT DOCUMENTS 1,718,824 6/1929 Jungers .

FOREIGN PATENT DOCUMENTS

| 658614 | 4/1938 | Fed. Rep. of Germany . |
| 1063871 | 5/1954 | France . |
| 1281723 | 12/1962 | France . |
| 1531390 | 7/1968 | France . |
| 2184579 | 12/1973 | France . |
| 8016 | of 1912 | United Kingdom .................. 65/93 |

*Primary Examiner*—Joye L. Woodard
*Attorney, Agent, or Firm*—Oblon, Spivak, McClelland, Maier & Neustadt

[57] ABSTRACT

A hot rolled sheet of glass having impressions impressed in the hot glass by a roller having raised projections. The projections are pyramidal or truncated pyramidal with either a square or hexagonal base. The projections produce craters which are separated from one another by a distance smaller than a largest dimension of the craters. In a variant, non-diffusing areas are inserted adjacent to diffusing zones.

11 Claims, 7 Drawing Sheets

METHOD FOR MAKING HOT ROLLED DIFFUSING GLAZINGS

BACKGROUND OF THE INVENTION

1. Field of the Invention

The invention relates to the field of glazings that diffuse light and are intended for lighting rooms.

2. Discussion of the Background

It has been known for a long time to transform a glass that is transparent and with parallel faces like a float glass into glass that diffuses light. The two most usual techniques are obscuring by sand blasting and etching by a paste having a hydrofluoric acid base. On the other hand, the technique of rolling flat glass with rollers to reproduce the surface structure of the rollers on the surface of the glass, by thus producing a patterned glass, is also well known. The two preceding families of production methods each make it possible to obtain glazings that diffuse light, but both exhibit certain drawbacks. Thus, the treatment methods of the float glass are very aggressive and "damage" the surface of the glass whose mechanical strength is reduced. Moreover, the surface has lost the characteristics which are those of a "fire polish" and it becomes easily soiled and difficult to maintain. In regard to the patterned glasses, the performances that they provide are often mediocre and always very different from those of diffusing glasses obtained by treatment of float glass.

Of the two techniques of the prior art which make it possible to obtain a plane glazing with a diffusing surface, the most common is sandblasting of a plane glass polished on both its faces, such as a float glass. Sandblasting techniques are used a great deal in multiple industries, they are used in closed chambers in which a pump produces the circulation of an abrasive powder (sand of defined grain size, corundum . . . ) in suspension in pressurized air. This sandblasting make it possible to treat the surfaces by attacking them to a more or less great depth, the result obtained is variable, from a simple cleaning of the surface to a restructuring in depth. Applied to a plate of polished glass, the method makes it possible to obtain an evenly obscured surface which, according to the depth of its raised patterns, more or less diffuses the light both in transmission and in reflection. At times, for various technical or aesthetic reasons, it is desired to keep a good transparency in certain zones of the glass plate. It is sufficient to achieve the result of protecting the relevant part with an elastomer film before inserting the plate into the chamber. The products used are, for example, sheet neoprene or latex deposited by brush. The concerned zone will appear intact after the separation of the elastomer. The purpose of such transparent zones in the center of totally diffusing surfaces can be to make it possible for an observer who brings his eye close to the glazing to see perfectly from the other side without being observed himself. It is also possible, by the same method, to obtain varied aesthetic effects.

The sandblasting technique is very simple to use and it makes it possible to obtain with a great versatility the reserves that are desired. The products obtained, however, exhibit two serious drawbacks which greatly limit the use of the sandblasting technique: sandblasted glazings are embrittled and very easily soiled. The greater brittleness of the sandblasted glass is noted if its resistance is compared to the bending (four point method) of the float glass with a base of that of an identical sandblasted sample, it is found that the value of the stress at the break point goes from 200 to 50 MPa. A practical drawback resides in the great facility with which the sandblasted glasses are soiled. Fingerprints, in particular, leave marks on their surface, which is very difficult to clean. The only means is to use powerful solvents and to act mechanically by brushing vigorously.

Etching, the other means used to make a float glass diffusing, makes it possible to overcome the two preceding drawbacks. The techniques of acid frosting are well known to specialists. More or less viscous solutions, pastes, are marketed. They all have a hydrofluoric acid base to which are added various chemical products, such as, for example, ammonium fluoride and fillers. The difficulty of this technique resides in its use: the products involved are very active and it is very difficult to make them act evenly. For this purpose, it is possible to use silk-screening techniques through a sieve of polyamide textile placed on the surface of the glass while the paste is displaced over the upper face of the sieve with a scraper. Another technique, that of French patent FR 1 503 587, proposes using an aggressive solution in the form of an aerosol to obtain the condensation of sized droplets on the glass. The product obtained is even and does not exhibit the drawbacks of the sandblasted product in particular, if the use of the method is carefully done, the mechanical strength of the product is of the same order—and even at times better—than that of the base glass. On the other hand, the surface state obtained is such that fingers generally leave no mark there.

However, the acid frosting technique shows two types of drawbacks. On the one hand, it poses problems relative to the environment, and on the other hand, it does not make it possible to obtain easily a composite glazing, diffusing for some parts of its surface, transparent for the remainder. Concerning the latter point, the protections that could be placed on the surface of a float glass to prevent the frosting of the zone concerned exhibit excess thicknesses that are troublesome for silk-screening and, on the other hand, chemical solutions are so aggressive that they penetrate under the protections and prevent obtaining clear boundaries at the border of the two zones. The dangers of the industrial use of hydrofluoric acid are well known, both for men and for the environment.

Methods making it possible to leave a given impression on hot glass have also been used to obtain special optical effects on the finished product.

U.S. Pat. No. 1,718,824 thus proposes, thanks to a technique of casting on a table, impressing in the surface of the glass a diffusing background thanks to a structure comprising holes which make the glazing translucent with a "frosted" surface. This diffusing background is interrupted by grooves with a V-shaped section which refract the light. This structure of the surface of the glass is the impression left by that of the table on which the glass is distributed before being rolled by a roller which leaves it an unstructured surface on the other side.

A more recent technique which relates to glass or plastic plates and which refers to the rolling of the glass between two rollers is described in patent FR 1 281 723. Its principle is to obtain a rippled effect by impressing on each of the faces of the glass a regular pattern consisting of regular rows of small conical prisms or circular cones in relief and/or recessed, the originality of the technique consisting in placing the rows of one face so that they make a small angle with the rows of the other.

The techniques described in the two preceding patents either give no detail on the diffusing structure, like the first which speaks of "the usual manner" of producing the "frosted" surface, or else show, like the second, a very rough structure where the pitch of the circular cones is on the order of the thickness of the glass plate, which is essential, moreover, to produce the indicated geometric figures.

SUMMARY OF THE INVENTION

Accordingly, one object of this invention is to provide a diffusing glazing which exhibits the optical quality of treated float glass without having its drawbacks, i.e., in particular, which is not easily soiled, which has a good bending strength, and whose details of the structure are not visible at a short distance.

The solution proposed by the invention to obtain diffusing flat glasses makes it possible to avoid the drawbacks of the preceding sandblasting or acid frosting techniques without using the same means as those of the prior art.

The invention proposes a diffusing glazing obtained by rolling of hot glass wherein impressions impressed in diffusing parts consist of pyramidal craters that are all identical, separated from one another by distances smaller than their largest dimension. These craters preferably have a hexagonal base, and they are often truncated pyramids. The bases of the craters are inscribed in circles with a diameter between 0.5 and 1.7 mm and the distance between two adjacent craters is less than one third of the diameter. The glazing of the invention has a diffusing structure such that it is not visible to the naked eye at a distance of at least 6 meters. In a variant, the distance from the centers of two adjacent craters is less than 1 mm and the fraction of the diffused transmitted light is greater than 20%. Optionally, the preceding diffusing zones enclose diffusing zones with patterns of larger pitch. In another variant, the glazing comprises, in addition to diffusing parts, transparent areas which are recessed from the surface of the glass with an approximately plane bottom, their depth is between 0.5 and 1 mm and is preferably 0.8 mm.

The invention relates, moreover, to the process for obtaining a diffusing glazing by a hot rolling technique in which the glass is rolled between a smooth lower roller and an upper roller comprising regularly spaced, identical pyramidal tips whose distance which separates them is smaller than the largest dimension of the pyramidal tips. These are preferably truncated hexagonal pyramids.

The invention also relates to a roller for producing a diffusing glass by rolling. It comprises regularly spaced, identical pyramidal tips, the distance separating the bases of the pyramids being smaller than their largest dimension. Further, the pyramidal tips are truncated hexagonal pyramids and the bases of the pyramids are inscribed in circles with a diameter between 0.5 and 1.7 mm. In a variant, the distance from the centers of two adjacent pyramidal tips is less than 1 mm. Further, the roller comprises smooth areas in relief at the upper part approximately parallel to its surface and whose thickness is between 0.5 and 1 mm and preferably 0.85 mm.

The techniques of the invention thus make it possible to obtain, with simple means, of a use conventional in industry, without danger to the environment, high-performing products which do not exhibit the drawbacks of prior techniques: the selection of the geometric pattern makes it possible to control the diffusion, the surface does not easily soil and it is easy to maintain. As for the transparent zones which can make viewing possible, they are obtained very easily and require no additional labor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1($a,b$), 2($a,b$), 3($a,b$) and 4($a,b$) show the appearance of the surface of the rolled glass according to the invention just after the rolling.

FIG. 5($a,b,c$) represents the appearance of the rolled glass with its viewing zones.

FIG. 6($a,b$) exhibits the statistical results of the bending tests.

DESCRIPTION OF THE PREFERRED EMBODIMENTS

Figure 7:
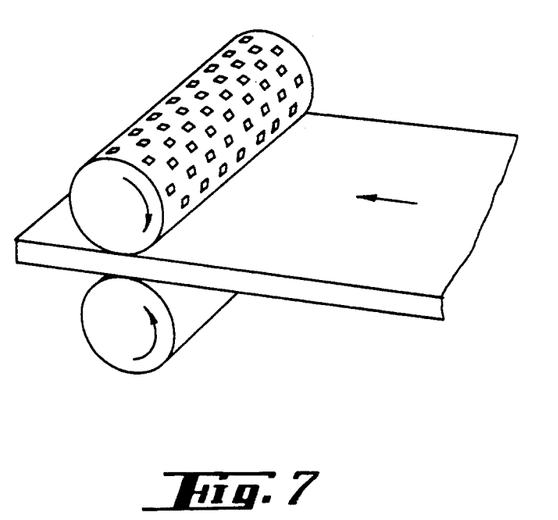
FIG. 7 shows a glass sheet passing between upper and lower rollers.

The technique of the invention is a rolling technique. The rolling of hot glass between two rollers is a technique known since the production of flat glass became industrial. The pasty glass, which flows out by overflowing the tank of a furnace heated either by flames above the bath or by Joule effect in the bath itself is directed to two horizontal steel rollers which entrain it by giving it the shape of a plate of a given width and thickness but of indefinite length. At least one of the rollers, in general the upper roller, has a peripheral surface with a raised pattern as shown in FIG. 7.

This structured surface is pressed on the malleable surface of the glass during the rolling and the latter, which is very soft at this temperature, at that moment takes the impression of this structure. However, since the glass has a significant thermal inertia, its surface does not set instantaneously. The stresses introduced in the glass mass during the impression have a tendency to relax while causing a surface creep. All these phenomena explain why the raised pattern of the surface of the roller is not exactly reproduced in negative on the surface of the glass after its cooling. If it is possible to define with precision the structure of the roller-impresser, the structure which results on the cold glass, the resulting impression, cannot be defined with precision. When it is desired to obtain a given optical effect with a patterned glass, the best way of characterizing this glass is to define with precision the raised pattern that it had at the time of the rolling, when the surface structure of the roller has plowed its surface. This structure is the duplicate, the shape exactly complementary of that of the roller.

To achieve the object of the invention, i.e., to obtain an optical effect, a diffusion of the light, which has the same qualities as that which a sandblasted or acid frosted glass produces, i.e., an even distribution of the transmitted light, without preferred orientations and the absence of structure visible to the naked eye at a distance less than six meters when the sample is lit with diffuse light, it has been discovered that it was sufficient to use an upper roller comprising pyramidal tips separated by "plane" zones. In actuality, the "plane" zones follow the surface of a circular cylinder at the periphery of the roller. The lower roller is smooth.

Figure 1A:
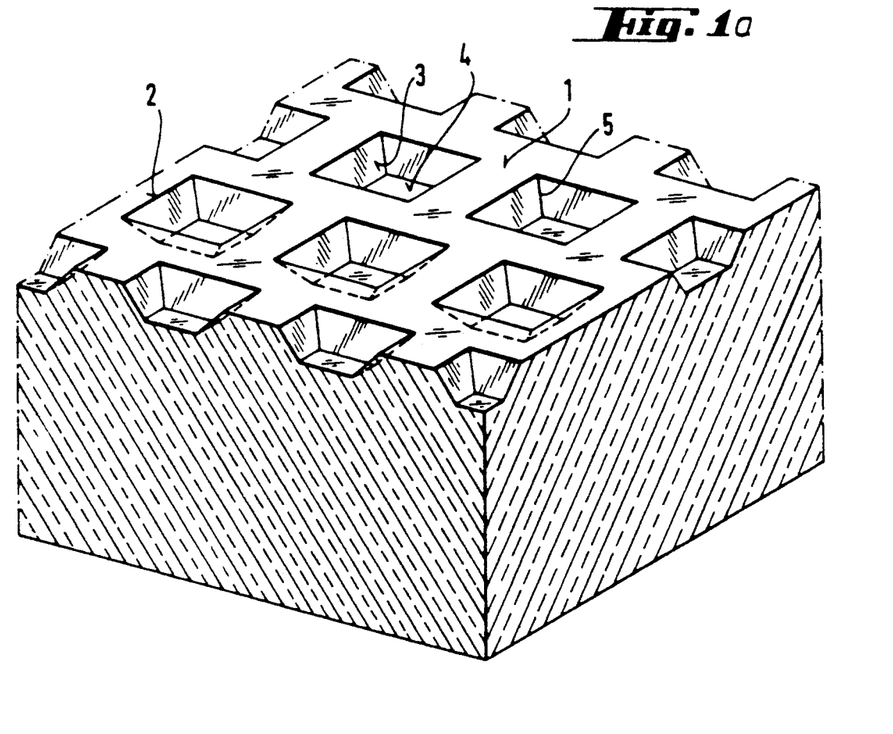
Figure 1B:
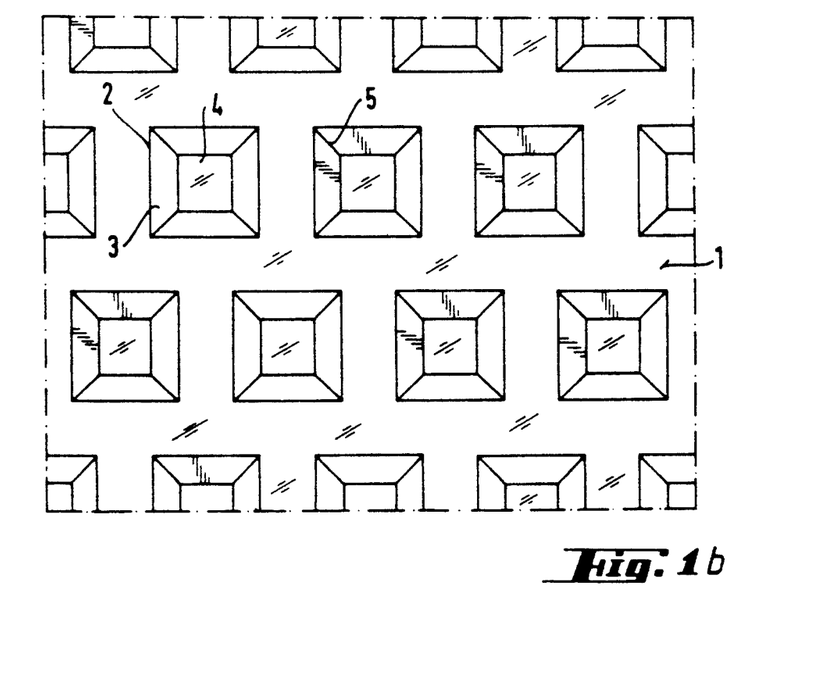

Referring now to the drawings, wherein like reference numerals designate identical or corresponding parts throughout the several views, and more particularly to FIG. 1 thereof, a first example of the raised pattern impressed in the mass of the glass during the rolling has been represented. According to the invention, the roller comprised pyramidal tips separated by "plane" zones. The tips were truncated pyramids with a square base. The raised pattern obtained on the hot glass comprises, in negative, the same raised pattern. At 1, it is seen that the surface remained plane. The square base o the pyramid leaves its mark at 2 and its lateral surfaces at 3 and the truncated vertex produces the square impression at the bottom of crater 4. As soon as the impression has been made in the pasty glass at the time of the rolling, all the sharp edges are softened. This is the case in particular for edges 5 of the impression. The pyramidal tips of the roller are arranged in staggered rows, and the same obviously holds true for the craters which mark the surface of the glass. The dimensions of the pyramidal tips at their base were 0.5×0.5 mm and at their truncated vertex 0.25×0.25 mm. The distance separating two parallel sides, which is the same in both directions to obtain an isotropic optical effect was 0.5 mm. The lateral face of the pyramid made an angle of approximately 45° with the plane of its base.

Figure 2A:
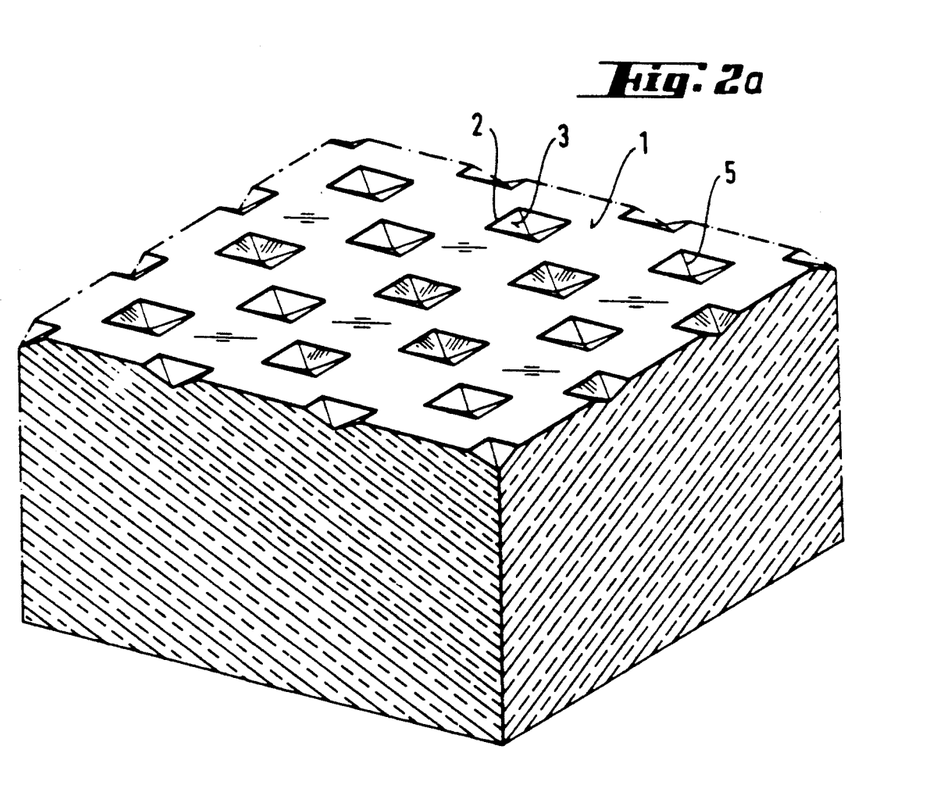
Figure 2B:
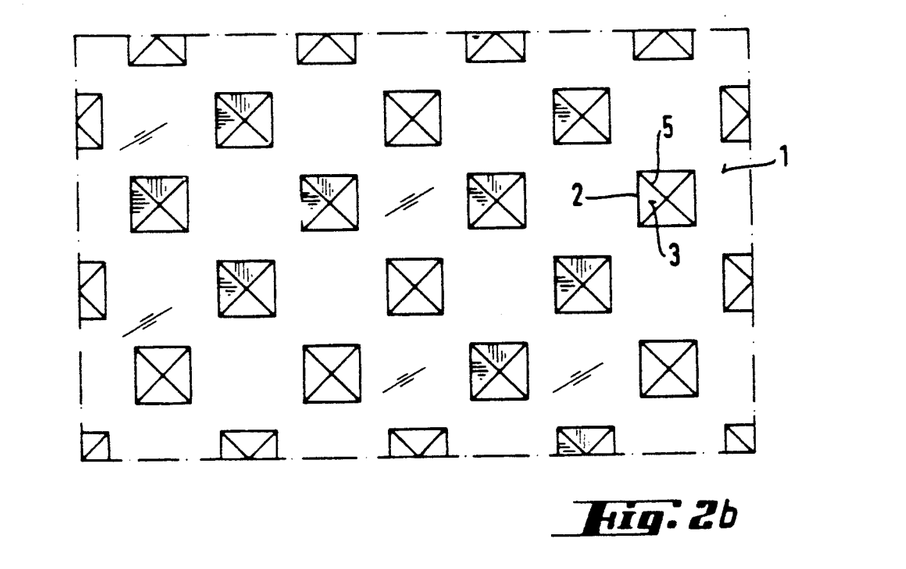

In FIG. 2, the represented pattern consists of "diamond tips." The pyramids, still with a square base, are not truncated. They are also arranged in staggered rows, the alignments constitute rows parallel to the sides of the bases of the pyramids and the distance from two successive axes is equal to 1.5 times the side. The side of the squares is 0.5 mm.

Figure 3A:
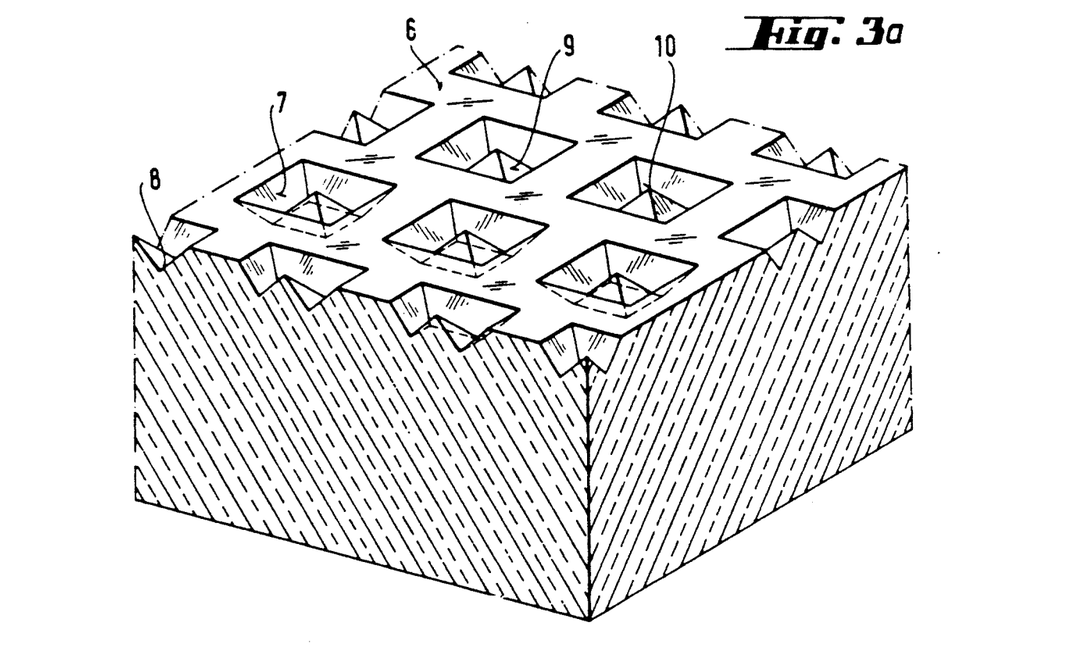
Figure 3B:
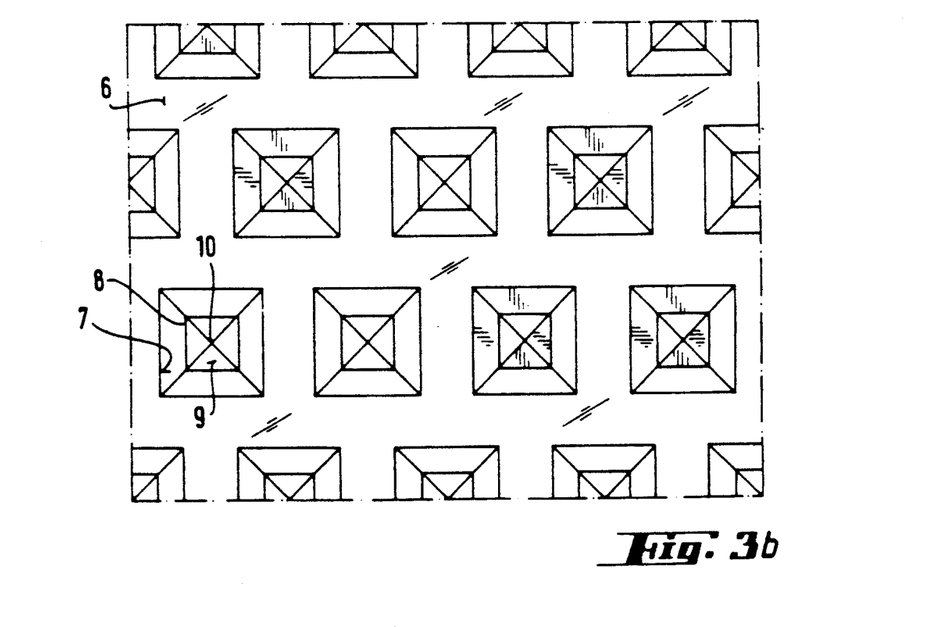

In FIG. 3, the arrangement is the same as in FIG. 2 but, here the shape of each pyramidal tip is special. The low part of the tip is that of a square pyramid, but, at mid-height of the vertex, the figure is inverted and the surface goes down again, recessed inside the base. The impression obtained on the hot glass is represented in the figure. At 6 the surface that remained plane is seen, at 7 the sides of the large pyramid, recessed in the glass, are seen. At 8 there is the square which constitutes the line of sharp changes and finally, at 9 the tip of the inverted pyramid. Since, in the example, the sharp changes were made at mid-height, tip 10 of the small pyramid was approximately at the level of the surface that remained plane of glass 6

Figure 4A:
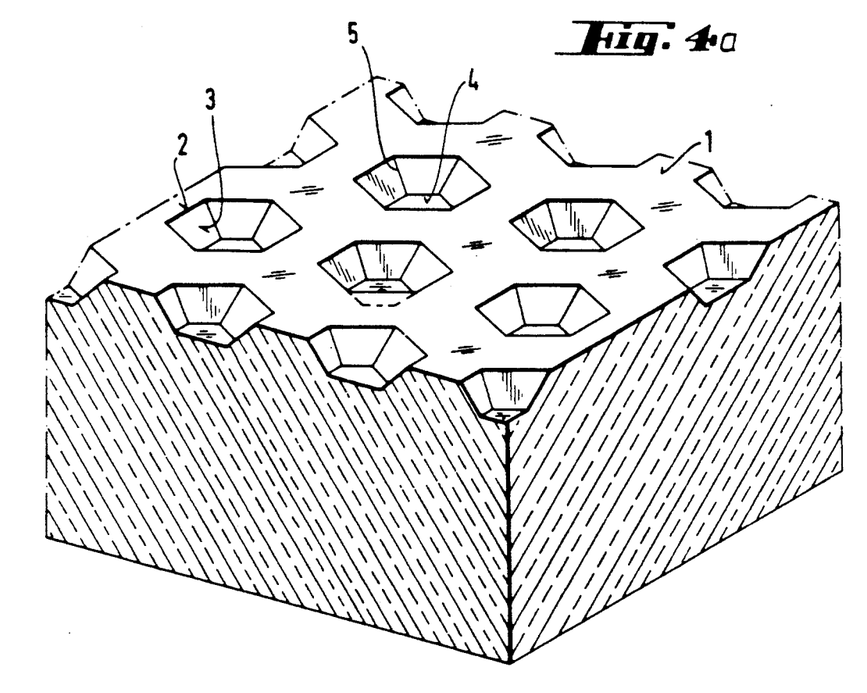
Figure 4B:
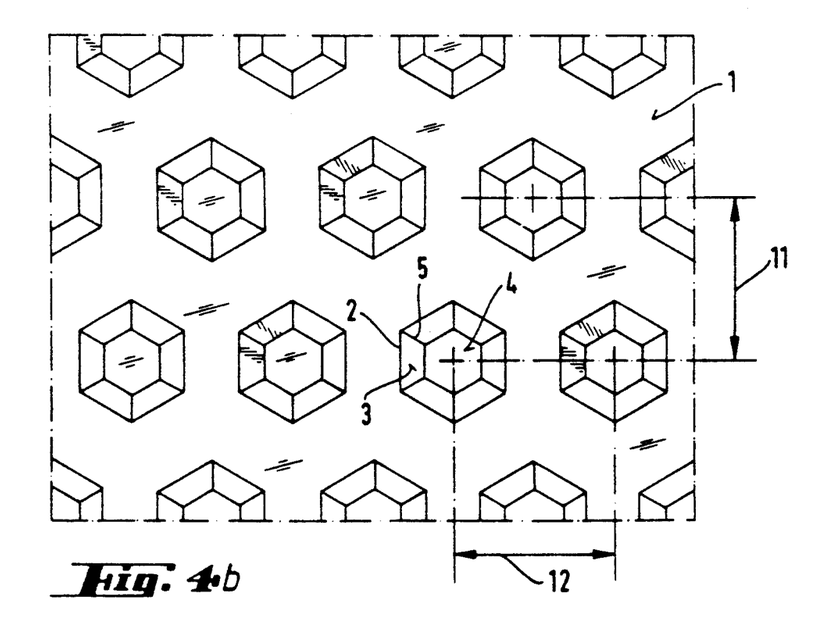

The principle of the pattern of FIG. 4 is the same as that of FIG. 1, the difference residing in the shape of the pyramidal tips which are hexagonal here. The shape obtained in the hot glass consequently consists of hexagonal cavities with a flat bottom. The shape preferred for the pyramid is that which has an angle of 60° between the base and the faces. The height of the truncated pyramid is half the diameter of the circle circumscribed in the basic polygon.

Two variants of the preceding pattern have been produced, one, type A, with a distance 11 between rows of pyramids of 0.7 mm and another, type B, with a distance of 1.7 mm. Distance 12 between two adjacent pyramids of the same row being respectively also 0.7 and 1.7 mm. The base of the pyramid is inscribed in a circle of diameter 0.7 mm for type A and 1.67 mm for type B. It follows that the pyramids of type A have their bases in contact with one another while those of type B have the sides of their bases distant by 0.20 mm in the same row and 0.55 mm from row to row.

The diffusing effect of the glazing according to the invention is obtained by the juxtaposition of the preceding pyramidal craters. Measurements of light diffusion have been made both on samples of type A and on those of type B, by way of comparison, the measurements have also been made with a sandblasted float glass. The measurement consists in lighting the sample at normal incidence with a parallel beam of white light and in collecting and measuring, on the other hand, all the transmitted light, with an integrating sphere. The latter has two positions, one which collects the parallel beam and the other which allows it to go out through an ad hoc opening. The measurement is made with or without a sample, and in the latter case, with o without the direct beam.

The most advantageous measurement is that of the fraction of the transmitted light which is diffused. In the three cases, with incidence on the smooth side, it has been found:

|  | Diffuse Fraction % |
|---|---|
| Sandblasting | 65.4 |
| Type A | 23.0 |
| Type B | 51.6 |

Composite diffusing samples have further been produced which comprised regular patterns of "large" size such as those of preceding type B, and, instead of approximately smooth intermediate areas, a fine diffusing structure, such as that of type A. The optical results are intermediate between those of preceding type A and type B.

Figure 5A:
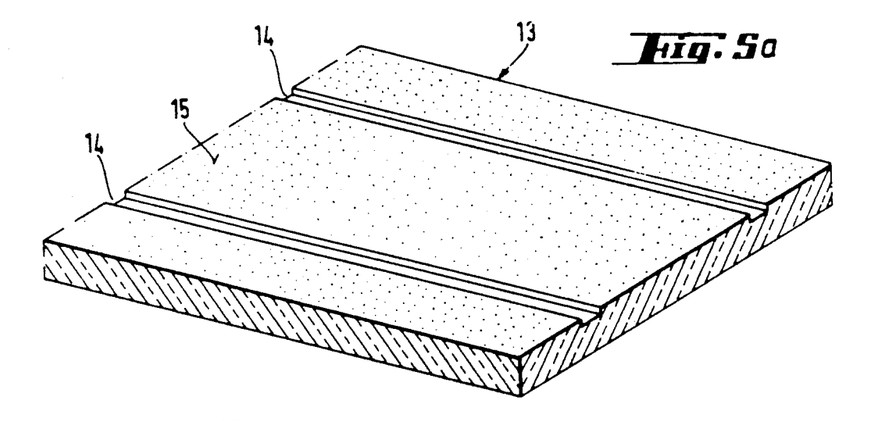
Figure 5B:
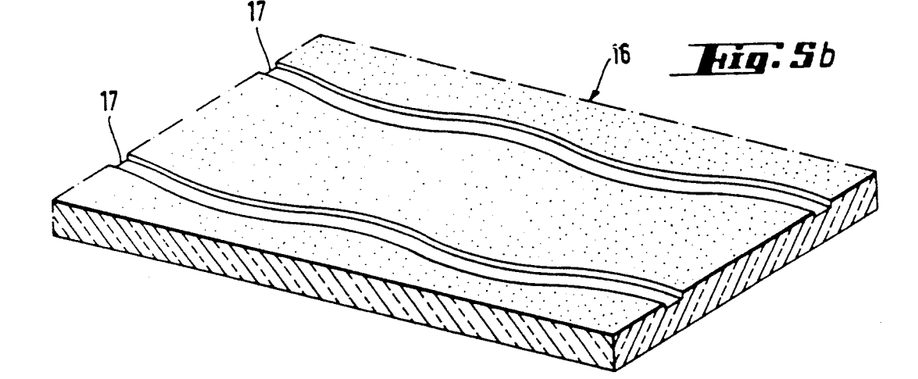
Figure 5C:
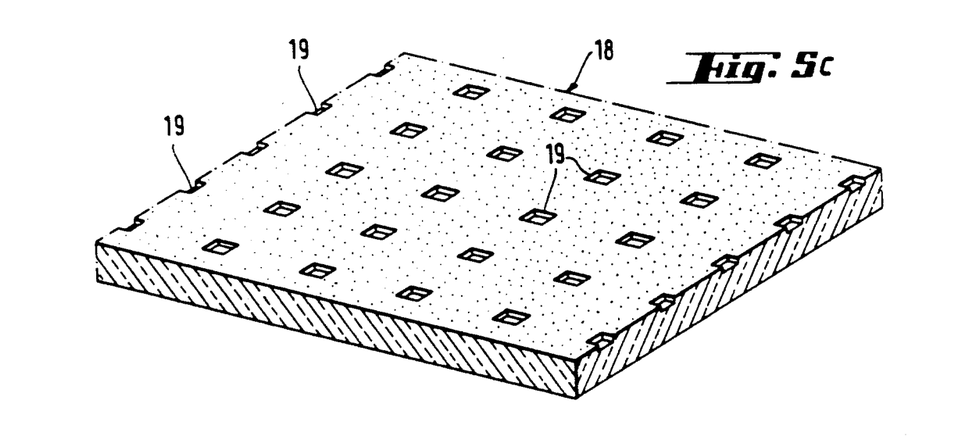

The embodiment that will be described where the entire surface is diffusing is obviously the most effective, however, for making possible the viewing through some zones of the glazing or for aesthetic reasons, the invention provides for inserting transparent areas with a bottom that is approximately flat and parallel to the glass plate distributed in the diffusing parts of overall surface that are much larger than the sum of the surfaces of the transparent areas. In FIG. 5, three embodiments have been represented. Pattern 13 comprises parallel transparent strips separated by diffusing zones. Transparent lines 14 have a width of 2 mm and a depth at the time of rolling of 0.8 mm, their spacing between axes is 22 mm. Intermediate diffusing zone 15 consists of the juxtaposition of hexagonal craters distant by 0.7 mm. Pattern 16 is identical at all points except for the shape of the lines which, instead of being straight, is sinusoidal with a period of 30 mm. As for pattern 18, it comprises clear zones 19, isolated in the diffusing part similar to the preceding ones, which are squares 2 mm on a side placed so as to produce a square mesh with a pitch of 9 mm. On the surface of the glass, the indentations of squares 19 have a depth of 0.8 mm.

The object of the invention is to provide diffusing glazings having properties that are equivalent to or better than those of glazings obtained by sandblasting or acid frosting techniques while working better and being nonpolluting. Of the performances, the fact that the rolled glasses are not susceptible to fingerprints is well known and from this viewpoint, the glazings of the invention have properties quite superior to those of sandblasted glasses. It was also desired to obtain better mechanical performances. Bending tests were therefore performed. The latter were performed on a dynamometer marketed by INSTRON on samples 4 mm thick, 80 mm long and 40 mm wide. The bending device is known as "four-support" and it makes it possible to obtain a uniform stress on a zone of 40×40 mm. For each type of glass, about thirty samples have been measured, and a statistical analysis has been performed, in particular, the straight lines of WEIBULL have been plotted which show that in the five cases the distribution was approximately Gaussian.

Figure 6A:
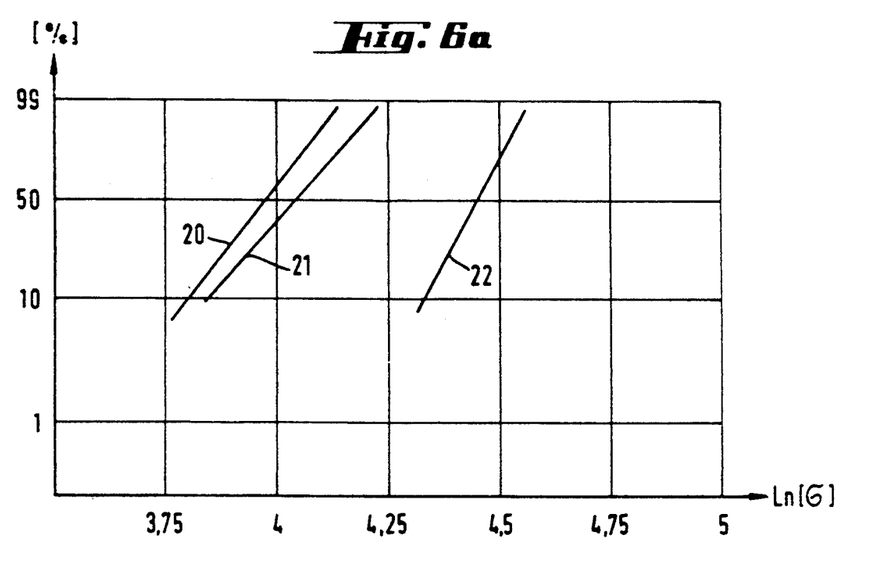
Figure 6B:
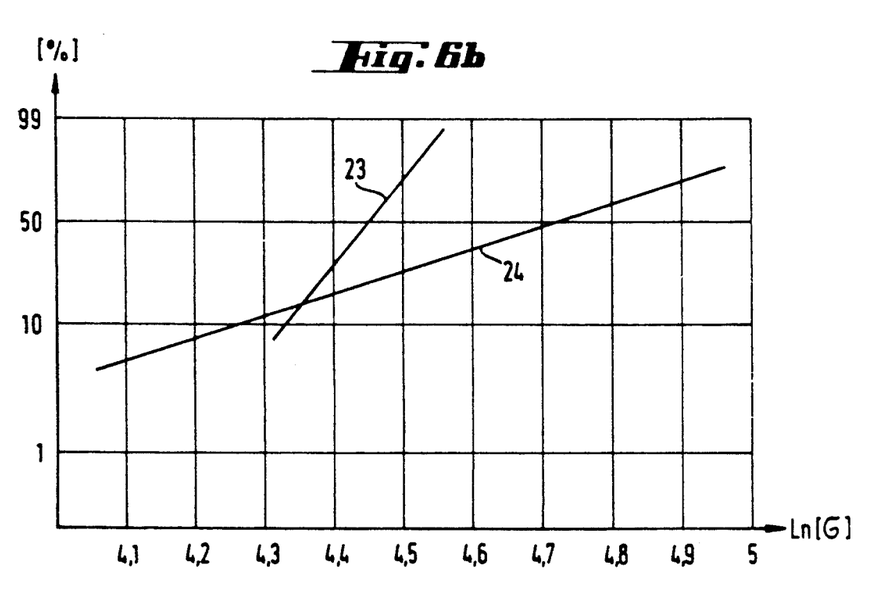

These straight lines are represented in FIG. 6. The natural logarithm of breaking stress $\sigma$ in megapascals is plotted in abscissa and, in ordinates, the cumulative percentage of the samples whose breakage occurred for a stress corresponding to the abscissa concerned. The scale of the percentages corresponds to the Gaussian distribution. In FIG. 6a, the behavior of a sandblasted sample is seen at 20. At 21, there is the straight line of WEIBULL of the samples of type B, i.e., obtained with hexagonal pyramidal tips with a pitch of 1.7 mm. At 22 is the WEIBULL curve of type A, i.e., with a pitch of 0.7 mm. In FIG. 6b, at 23 the same straight line (corresponding to type B) is seen with a different abscissa scale. At 24 the synthesis of the bending results obtained with a rolled glass with two smooth faces is seen.

The median values of the four glass types are restated in the table.

| | BREAKING STRESS UNDER BENDING (median) | | | |
|---|---|---|---|---|
| Glass | Sandblasted | Type B | Type A | Rolled smooth |
| Ln ($\sigma$) | 3.95 | 4.04 | 4.40 | 4.68 |

This table shows that the results obtained with the rolled glasses of the invention are intermediate between those of a smooth rolled glass and those of a sandblasted glass.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for obtaining a diffusing glazing, comprising the steps of:
    rolling a sheet of glass between a smooth lower roller and an upper roller in a hot rolling technique, wherein the upper roller has a plurality of regularly spaced, identical pyramidal tips having a largest dimension and being separated by a distance which is smaller than the largest dimension; and
    forming smooth areas in the sheet of glass which are free of craters formed by said pyramidal tips, said smooth areas being recessed in a surface of the glass and having an approximately planar bottom.

2. The process according to claim 1, wherein the pyramidal tips are truncated hexagonal pyramids.

3. The process according to claim 1, wherein the pyramidal tips are selected from the group consisting of hexagonal base pyramidal tips and square base pyramidal tips.

4. The process according to claim 3, wherein the pyramidal tips are truncated pyramids.

5. The process according to claim 4, wherein the pyramidal tips have bases which are inscribed in circles having a diameter between 0.5 and 1.7 mm.

6. The process according to claim 5, wherein a distance separating two adjacent bases is less than one-third of said diameter.

7. The process according to claim 1, wherein each of said tips has a center, and wherein a distance between the centers of two adjacent tips is less than 1 mm.

8. The process according to claim 1, wherein the pyramidal tips taper in a first direction, and wherein each of said pyramidal tips includes a pyramidal crater tapering in an opposite direction.

9. The process according to claim 1, wherein each of said smooth areas has a depth between 0.5 and 1 mm.

10. The process according to claim 1, wherein the depth of each of said smooth areas is 0.8 mm.

11. A process for obtaining a diffusing glazing by a hot rolling technique, comprising the steps of:
    rolling a sheet of glass between a smooth lower roller and an upper roller, wherein the upper roller has a plurality of regularly spaced, identical pyramidal tips having a largest dimension and being separated by a distance which is smaller than the largest dimension, wherein the pyramidal tips taper in a first direction, and wherein each of said pyramidal tips includes a pyramidal crater tapering in an opposite direction.

* * * * *